United States Patent
Jiang

(10) Patent No.: US 6,673,847 B2
(45) Date of Patent: Jan. 6, 2004

(54) WATER IMMISCIBLE POROGEN REMOVAL PROCESS

(75) Inventor: Biwang Jiang, Horsham, PA (US)

(73) Assignee: Rohm and Haas Company, Philadelphia, PA (US)

(*) Notice: Subject to any disclaimer, the term of this patent is extended or adjusted under 35 U.S.C. 154(b) by 97 days.

(21) Appl. No.: 10/113,744

(22) Filed: Apr. 1, 2002

(65) Prior Publication Data

US 2003/0187183 A1 Oct. 2, 2003

(51) Int. Cl.[7] .................................................. C08F 8/18
(52) U.S. Cl. ........................... 521/56; 521/61; 525/344; 526/323.2; 526/336
(58) Field of Search ..................... 521/56, 61; 526/336, 526/323.2; 525/344

(56) References Cited

U.S. PATENT DOCUMENTS

| 5,830,967 | A | | 11/1998 | Sojka | 526/323.2 |
| 5,834,577 | A | * | 11/1998 | Sojka | 526/323.2 |
| 5,871,722 | A | * | 2/1999 | Nacht et al. | 424/78.03 |
| 5,955,552 | A | | 9/1999 | Sojka | 526/88 |
| 6,107,429 | A | | 8/2000 | Sojka | 526/323.2 |
| 6,235,802 | B1 | * | 5/2001 | Lundquist et al. | 521/56 |
| 6,323,249 | B1 | | 11/2001 | Dale et al. | 521/38 |

FOREIGN PATENT DOCUMENTS

EP 0135292 A1 7/1983

* cited by examiner

Primary Examiner—David W. Wu
Assistant Examiner—Henry S Hu

(57) ABSTRACT

The present invention relates to a method of removing water immiscible porogens from macroreticular copolymers comprising distilling said porogen in water soluble organic solvent.

1 Claim, No Drawings

WATER IMMISCIBLE POROGEN REMOVAL PROCESS

BACKGROUND

The use of solvents as porogens in the preparation of macroreticular polymers is known to those skilled in the art. See, EP 0135292, U.S. Pat. Nos. 6,107,429, 5,830,967, U.S. Pat. No. 5,955,552 and U.S. Pat. No. 6,323,249. However, solvents which are used as porogens in the preparation of macroreticular polymers have to be removed after polymerization. There are three commonly used porogen-removal processes depending on the type of porogen. Some porogens like 4-methyl-2-pentanol and isobutanol which form azeotropes with water, being slightly water soluble, can be simply distillated and recycled. Other porogens such as those having a high molecular weight and a high boiling point can be removed by solvent extraction. Then the residue solvent in the beads can be removed by distillation. However, low molecular weight and low boiling point porogens, like isooctane and hexamethyldisiloxane are highly water insoluble. These low molecular weight and low boiling point porogens present a particularly difficult problem. Simple distillation is very inefficient in removing these highly water insoluble porogens from copolymer beads such as polystyrene-divinylbenzene copolymer beads. Solvent extraction can be used to remove these type porogens but, the separation of the porogen from the extracting solvent is difficult. Steam can be used to remove these porogens but the copolymer beads have to be sufficiently rigid to survive the harsh steam conditions. In the case of copolymers with relatively low levels of crosslinker, their relatively low glass transition temperature (Tg), will lead to unrecoverable pore collapse, and possible melting, if the steam temperature is higher than polymer Tg.

Now, Applicant has discovered a method for removing highly water insoluble porogens, such as isooctane and hexamethyldisiloxane, that does not destroy the desired porosity of the copolymer, even if the copolymer has very low level of crosslinker.

SUMMARY OF THE INVENTION

The present invention relates to a method of removing water insoluble porogens from macroreticular copolymers comprising distilling said porogen in the presence of a water soluble organic solvent selected from the group consisting of 2-methoxyethanol, di(ethylene glycol) mono-methyl ether, di(ethylene glycol) mono-ethyl ether, di(ethylene glycol) mono-butyl ether, di(ethylene glycol) dimethyl ether, di(ethylene glycol) diethyl ether, di(ethylene glycol) ethyl ether acetate, poly(ethylene glycol) mono-methyl ether, tri (ethylene glycol), tri(ethylene glycol) mono-methyl ether, tri(ethylene glycol) mono-ethyl ether, poly(ethylene glycol) dimethyl ether, poly(ethylene glycol)-co-(propylene glycol) having a viscosity of less than 200 cps; 1,2-propanediol, 1,3-propanediol, 1,3-butanediol, 1,4-butanediol, 1,6-hexanediol, dimethyl sulfate and mixtures thereof.

DETAILED DESCRIPTION OF THE INVENTION

The present invention relates to a method of removing water insoluble porogens from macroreticular copolymers comprising distilling said porogen in the presence of a water soluble organic solvent selected from the group consisting of 2-methoxyethanol, di(ethylene glycol) mono-methyl ether, di(ethylene glycol) mono-ethyl ether, di(ethylene glycol) mono-butyl ether, di(ethylene glycol) dimethyl ether, di(ethylene glycol) diethyl ether, di(ethylene glycol) ethyl ether acetate, poly(ethylene glycol) mono-methyl ether, tri (ethylene glycol), tri(ethylene glycol) mono-methyl ether, tri(ethylene glycol) mono-ethyl ether, poly(ethylene glycol) dimethyl ether, poly(ethylene glycol)-co-(propylene glycol) having a viscosity of less than 200 cps; 1,2-propanediol, 1,3-propanediol, 1,3-butanediol, 1,4-butanediol, 1,6-hexanediol, dimethyl sulfate and mixtures thereof.

Porogens that can be removed by the method of the present invention are water immiscible and relatively volatile, having a boiling point of less than about 180° C., more preferably less than about 150° C. at one atmosphere. Examples of such porogens include, but are not limited to, straight or branched alkanes having 5–12 carbon atoms like isooctane, heptane, hexanes, pentane; cycloalkanes having 5–12 carbon atoms like cyclohexane, methylcyclohexane; aromatic solvents like toluene, xylene, benzene; volatile silicones like hexamethyldisiloxane, decamethyltetrasiloxane. Other porogens that can be removed by the method of the present invention include water immiscible $C_4$–$C_{15}$ alcohols like 4-methyl-2-pentanol; esters like butyl acetate; and ethers like dibutyl ether with boiling points of less than about 180° C.

Water soluble organic solvents useful in the practice of the present invention have the following properties: (1) said solvent is compatible with water or soluble in water, so the residue of the solvent can be removed by water washing at the end of the distillation. (2) said solvent is incapable of swelling the copolymer matrix and it exerts essentially no solvent action on the copolymer (3) said solvent should be stable or chemically inert under the distillation condition and can be recycled. (4) said solvent should have a higher boiling point than that of the porogen, so the porogen is mainly removed without removing the adding solvent during the distillation.

Preferred water soluble organic solvents which meet above requirements are poly(ethylene glycol) of following formula: $R_1$—$(OCH_2CH_2)n$—$OR_2$, wherein group $R_1$ and $R_2$ can be H, benzyl or $C_1$–$C_{15}$ alkyl groups, preferred alkyl group having 1 to 6 carbon atoms, $R_1$ and $R_2$ can be the same or different groups. The number (n)of ethylene glycol ($OCH_2CH_2$) repeating units can be from 1 to 500, preferred from 1 to 100, more preferred from 1–50, most preferred from 1–20. Non limiting examples of preferred water soluble organic solvents are 2-methoxyethanol, di(ethylene glycol) mono-methyl ether, di(ethylene glycol) mono-ethyl ether, di(ethylene glycol) mono-butyl ether, di(ethylene glycol) mono-hexyl ether, di(ethylene glycol) dimethyl ether, di(ethylene glycol) diethyl ether, di(ethylene glycol) dibutyl ether, tri(ethylene glycol), tri(ethylene glycol) dimethyl ether, tri(ethylene glycol) mono-ethyl ether, di(ethylene glycol) ethyl ether acetate, poly(ethylene glycol) mono-methyl ether, poly(ethylene glycol) dimethyl ether, poly(ethylene glycol) dibenzoate; water miscible poly (propylene glycol) or poly(ethylene glycol)-co-(propylene glycol) having a viscosity of less than 500 cps, and mixtures thereof.

Other examples of preferred water soluble organic solvents are polyvinyl alcohol, and poly(vinyl pyrrolidine), and polyacrylate salts having molecular weight less than 10000, more preferred less than 2000 and most preferred less than 500.

Still other examples of preferred water soluble organic solvents are 1,2- or 1,3-propanediol, 1,3- or 1,4-butanediol, 1,6-hexanediol, 1,8-octanediol, cyclohexanediol, or cyclohexanetriol, dimethylformamide, and dimethyl sulfate.

More preferred water soluble organic solvents are 2-methoxyethanol, di(ethylene glycol) mono-methyl ether, di(ethylene glycol) mono-ethyl ether, di(ethylene glycol) mono-butyl ether, di(ethylene glycol) mono-hexyl ether, di(ethylene glycol) dimethyl ether, di(ethylene glycol) diethyl ether, di(ethylene glycol) dibutyl ether, tri(ethylene glycol), tri(ethylene glycol) dimethyl ether, tri(ethylene glycol) mono-ethyl ether, di(ethylene glycol) ethyl ether acetate, poly(ethylene glycol) mono-methyl ether, poly(ethylene glycol) dimethyl ether, poly(ethylene glycol) dibenzoate; water miscible poly(propylene glycol) or poly(ethylene glycol)-co-(propylene glycol) having a viscosity of less than 500 cps, polyvinyl alcohol, and poly(vinyl pyrrolidine), and polyacrylate salts having molecular weight less than 1000; 1,2- or 1,3-propanediol, 1,3- or 1,4-butanediol, 1,6-hexanediol, 1,8-octanediol, cyclohexanediol, or cyclohexanetriol, dimethylformamide, dimethyl sulfate and mixtures thereof.

The most preferred examples of water soluble solvents are 2-methoxyethanol, di(ethylene glycol) mono-methyl ether, di(ethylene glycol) mono-ethyl ether, di(ethylene glycol) mono-butyl ether, di(ethylene glycol) dimethyl ether, di(ethylene glycol) diethyl ether, di(ethylene glycol) ethyl ether acetate, poly(ethylene glycol) mono-methyl ether, tri(ethylene glycol), tri(ethylene glycol) mono-methyl ether, tri(ethylene glycol) mono-ethyl ether, poly(ethylene glycol) dimethyl ether, poly(ethylene glycol)-co-(propylene glycol) having a viscosity of less than 200 cps; 1,2- or 1,3-propanediol, 1,3- or 1,4-butanediol, 1,6-hexanediol, dimethyl sulfate and mixtures thereof.

Any of the aforementioned water soluble organic solvents or mixtures of said water soluble organic solvents may be used for distillation of the porogen. The percent of water soluble organic solvent in the distillation medium can be varied from 1% to 100% by weight, preferably from 10 to 95%, more preferably from 20% to 90%, most preferably from 30% to 90%.

The method of the present invention involves adding the water soluble organic solvent to water as a distillation medium. The porogen is then distilled and recovered. The residue of water soluble organic solvent is washed out with water and recycled.

The process of the present invention is described hereinbelow:

1) Porogen imbibed copolymer beads are charged into a 2L round bottom flask, equipped with a thermometer, a stirrer, distillate receiver and condenser.

2) A mixture of water and water soluble organic soluble solvent is added to the step 1 copolymer beads with stirring.

3) Said copolymer bead mixture from step 2 is heated to begin distillation. The distillation temperature is determined according to the kind of porogen utilized, and generally is in the range of from about 60° C. to about 180° C.

4) The distillate normally contains two phases: one is the pure porogen at the top of the receiver, the other is the aqueous phase which may contain some added solvent depending on the type of solvent used, the two phases are then separated, the porogen is recovered and recycled.

5) The heat is stopped when the porogen is recovered.

6) The copolymer bead mixture is cooled. The water is drained and the residue of added water soluble organic solvent is displaced with water by washing.

The following non limiting examples illustrate the practice of the present invention:

EXAMPLE 1

Porogen imbibed macroreticular copolymer beads (opaque) were made by the suspension copolymerization of the mixture of styrene (300 g), divinylbenzene (24 g, 55% concentration), Benzoyl peroxide (4.3 g, 75%) and hexamethyldisiloxane (132 g). The resulting copolymer beads were then charged into a 4-necked round bottom flask equipped with a stirrer, temperature controller, distillate receiver and condenser. The water was removed by siphon and a mixture of water (300 g) and di(ethylene glycol) mono-methyl ether (600 g) was charged to above flask. The mixtures were stirred and heated to undergo distillation. The distillation started at around 90° C., and finished at around 125° C. The distillate was composed of hexamethyldisiloxane and water which can be readily separated by separation funnel. The top layer was mainly hexamethyldisiloxane (porogen) (~97%) and small percent of styrene (~3%) (measured by GC), the bottom layer was mainly water. The distillation was stopped when 98% of hexamethyldisiloxane was recovered (3–6 hrs). The liquid in the flask was then drained off and the residue of di(ethylene glycol) mono-methyl ether was removed by water washing. The residue level of porogen in the resulting copolymer beads (measured by Gas Chromatography (GC) is below 0.1%. The copolymer beads are opaque.

EXAMPLE 2

Porogen imbibed macroreticular copolymer beads (opaque) were made from the suspension copolymerization of the mixture of styrene (300 g), divinylbenzene (24 g, 55% concentration), benzoyl peroxide (4.3 g, 75%) and isooctane (porogen) (240 g). The resulting copolymer beads were then charged into a 4-necked round bottom flask equipped with a stirrer, temperature controller, distillate receiver and condenser. The water was removed by siphon and a mixture of water (200 g) and di(ethylene glycol) mono-methyl ether (800 g) was charged to above flask. The mixtures were stirred and heated to undergo distillation. The distillation started at around 85° C., and finished at around 110° C. The distillate was composed of isooctane and water, which can be readily separated by separation funnel. The top layer was mainly isooctane (~97%) and small percent of styrene (~3%) (measured by GC), the bottom layer was mainly water. The distillation was stopped when >98% of isooctane was recovered (2–4 hrs). The liquid in the flask was then drained off and the residue of di(ethylene glycol) mono-methyl ether was removed by water washing. The residue level of isooctane in the resulting copolymer beads (measured by GC) is below 0.1%.

EXAMPLE 3

The porogen imbibed macroreticular copolymer beads (opaque) were made from the suspension copolymerization of the mixture of styrene (300 g), divinylbenzene (24 g, 55% concentration), Benzoyl peroxide (4.3 g, 75%) and hexamethyldisiloxane (porogen)(152 g). The resulting copolymer beads were then charged into a 4-necked round bottom flask equipped with a stirrer, temperature controller, distillate receiver and condenser. The water was removed by siphon and a mixture of water (300 g) and 2-methoxyethanol (600 g) was charged to above flask. The mixtures were stirred and heated to undergo distillation with temperature from 85° C. to 115° C. The distillate was composed of hexamethyldisiloxane and water which can be readily separated by separation funnel. The top layer is mainly hexamethyldisiloxane (~97%) with small percent of styrene (~3%) (measured by GC), the bottom layer is mainly water with small amount of methoxyethanol. The distillation was stopped when 98% of hexamethyldisiloxane was recovered (3–6 hrs). The liquid in the flask was then drained off and the residue of 2-methoxyethanol was removed by water washing. The residue level of porogen in the resulting copolymer beads (measured by GC) is below 0.1%. The resulting copolymer beads are opaque.

EXAMPLE 4 (COMPARATIVE EXAMPLE—SIMPLE DISTILLATION)

Porogen imbibed macroreticular copolymer beads (opaque) were made from the suspension copolymerization of the mixture of styrene (300 g), divinylbenzene (24 g, 55% concentration), benzoyl peroxide (4.3 g, 75%) and isooctane (porogen) (240 g). The resulting copolymer beads were then charged into a 4-necked round bottom flask equipped with a stirrer, temperature controller, distillate receiver and condenser. Water (1000 g) was added to above flask. The mixtures were stirred and heated to 95–105° C. for distillation. Most of the distillate is water with a very small portion of isooctane. After heating more than 10 hrs, only less 50% isooctane was recovered. The resulting beads appeared translucent.

EXAMPLE 5 (COMPARATIVE EXAMPLE—STEAM DISTILLATION)

Porogen imbibed macroreticular copolymer beads (opaque) were made from the suspension copolymerization of the mixture of styrene (300 g), divinylbenzene (24 g, 55% concentration), benzoyl peroxide (4.3 g, 75%) and isooctane (porogen) (240 g). The resulting copolymer beads were then charged into a column equipped with steam inlet and outlet. The temperature of the steam was 105–120° C. The steam was passed through the copolymer beads for about 5 hrs. Six bed volumes of steam as condensate was collected. 85–90% of the isooctane was recovered. Before the steaming procedure the copolymer beads were very opaque and homogeneous appearance. However, after the steam treatment, the copolymer beads were gel like and completely transparent indicating the pore collapse.

I claim:

1. A method of removing water immiscible porogens from macroreticular copolymer beads comprising distilling said porogen in the presence of water and a water soluble organic solvent selected from the group consisting of 2-methoxyethanol, di(ethylene glycol) mono-methyl ether, di(ethylene glycol) mono-ethyl ether, di(ethylene glycol) mono-butyl ether, di(ethylene glycol) dimethyl ether, di(ethylene glycol) diethyl ether, di(ethylene glycol) ethyl ether acetate, poly(ethylene glycol) mono-methyl ether, tri (ethylene glycol), tri(ethylene glycol) mono-methyl ether, tri(ethylene glycol) mono-ethyl ether, poly(ethylene glycol) dimethyl ether, poly(ethylene glycol)-co-(propylene glycol) having a viscosity of less than 200 cps; 1,2-propanediol, 1,3-propanediol, 1,3-butanediol, 1,4-butanediol, 1,6-hexanediol, dimethyl sulfate and mixtures thereof.

* * * * *